L. C. MALTBY.
AUTOMATIC MACHINE FOR MAKING SPIRALLY WOUND TUBES.
APPLICATION FILED AUG. 28, 1913.

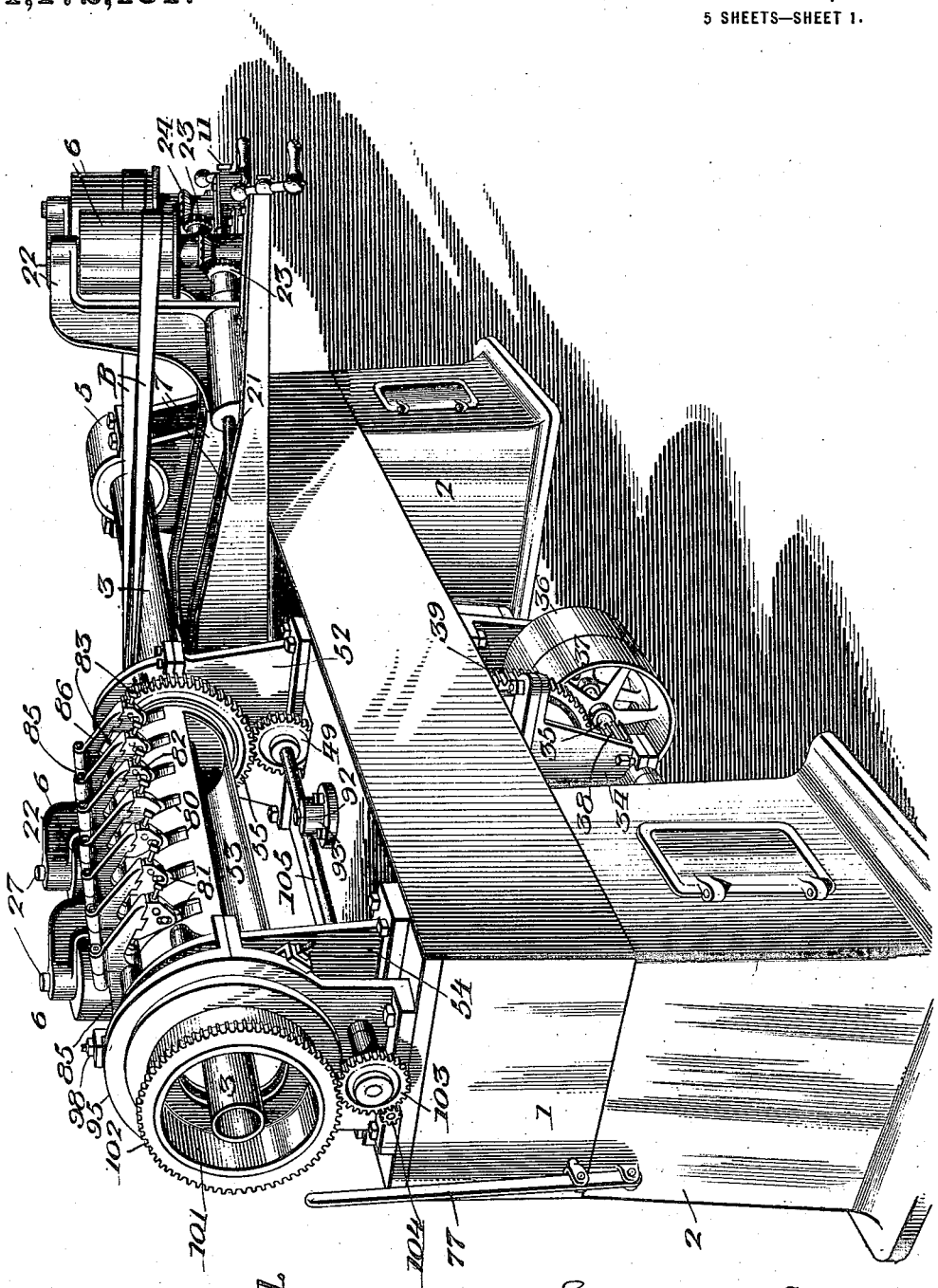

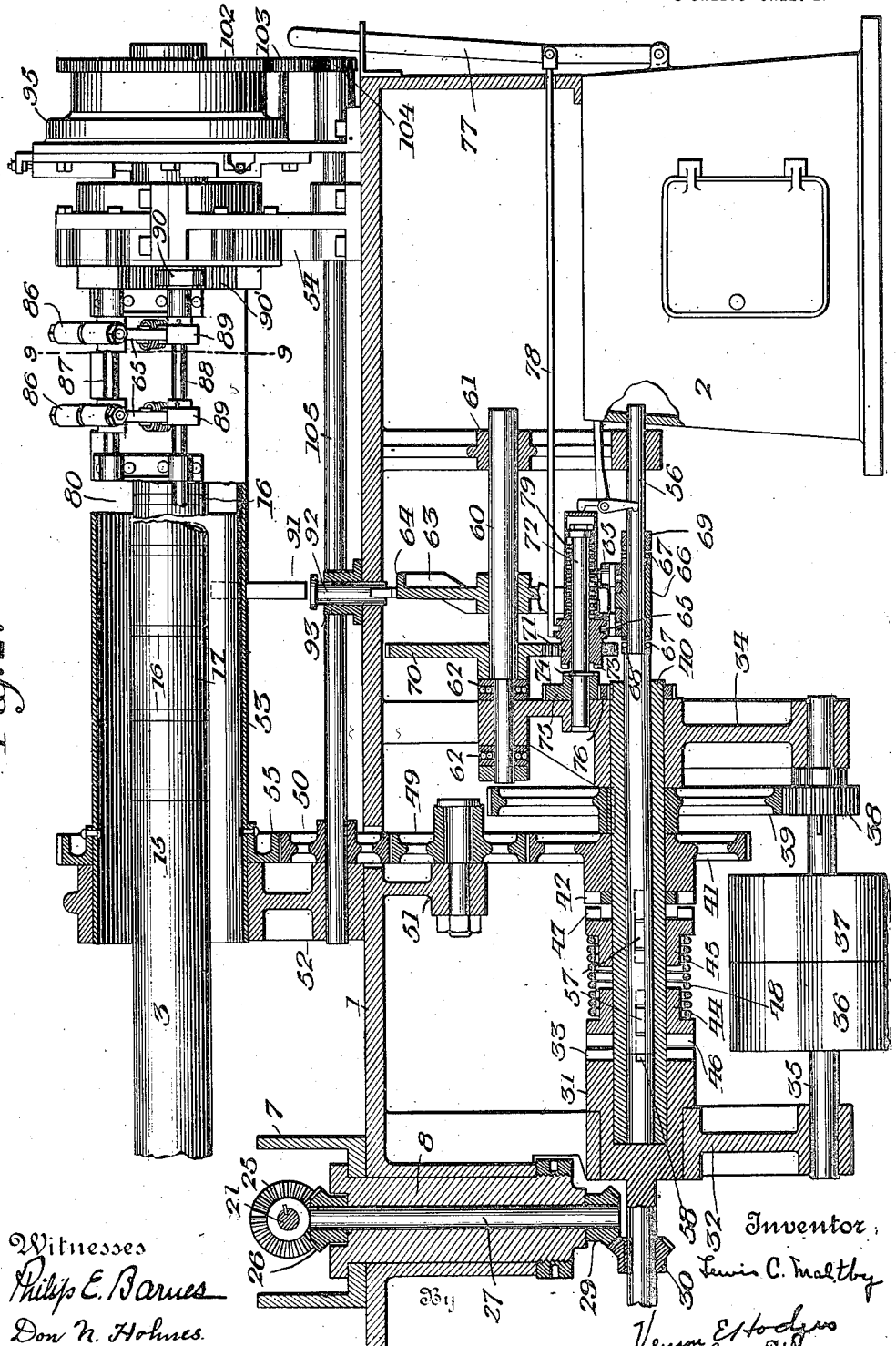

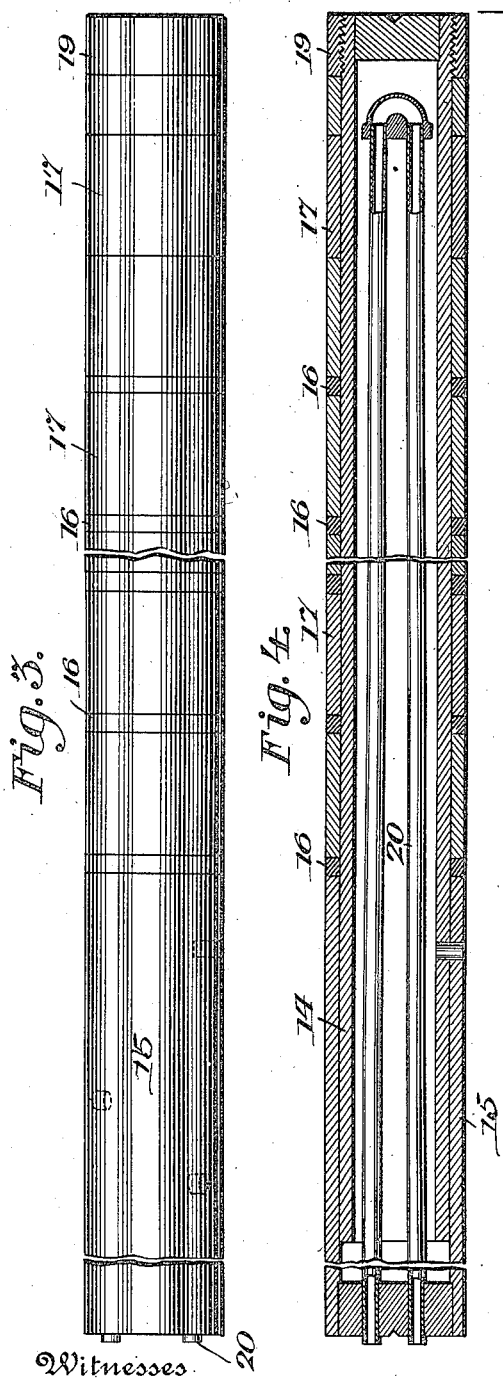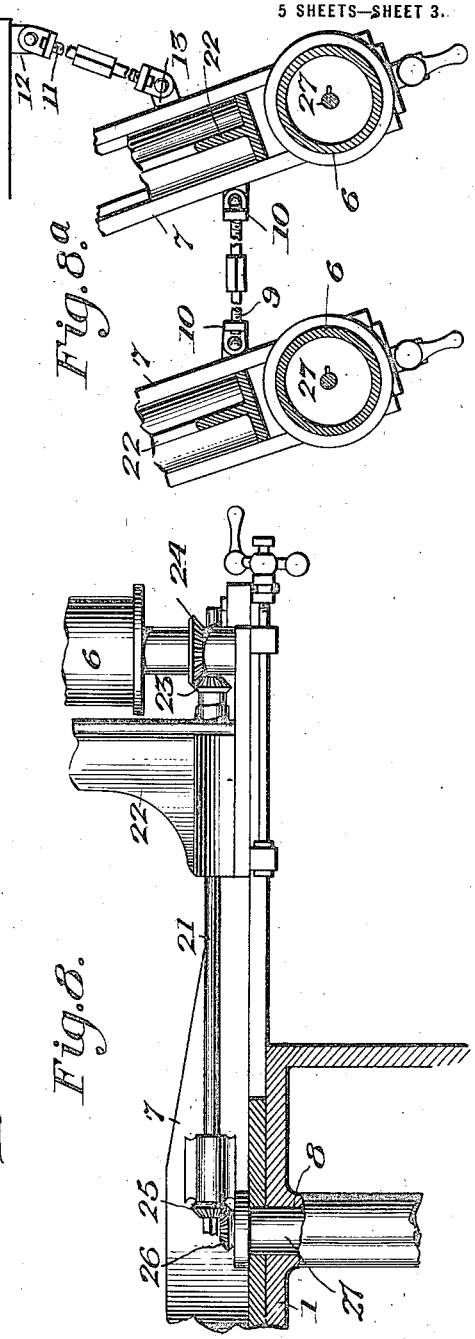

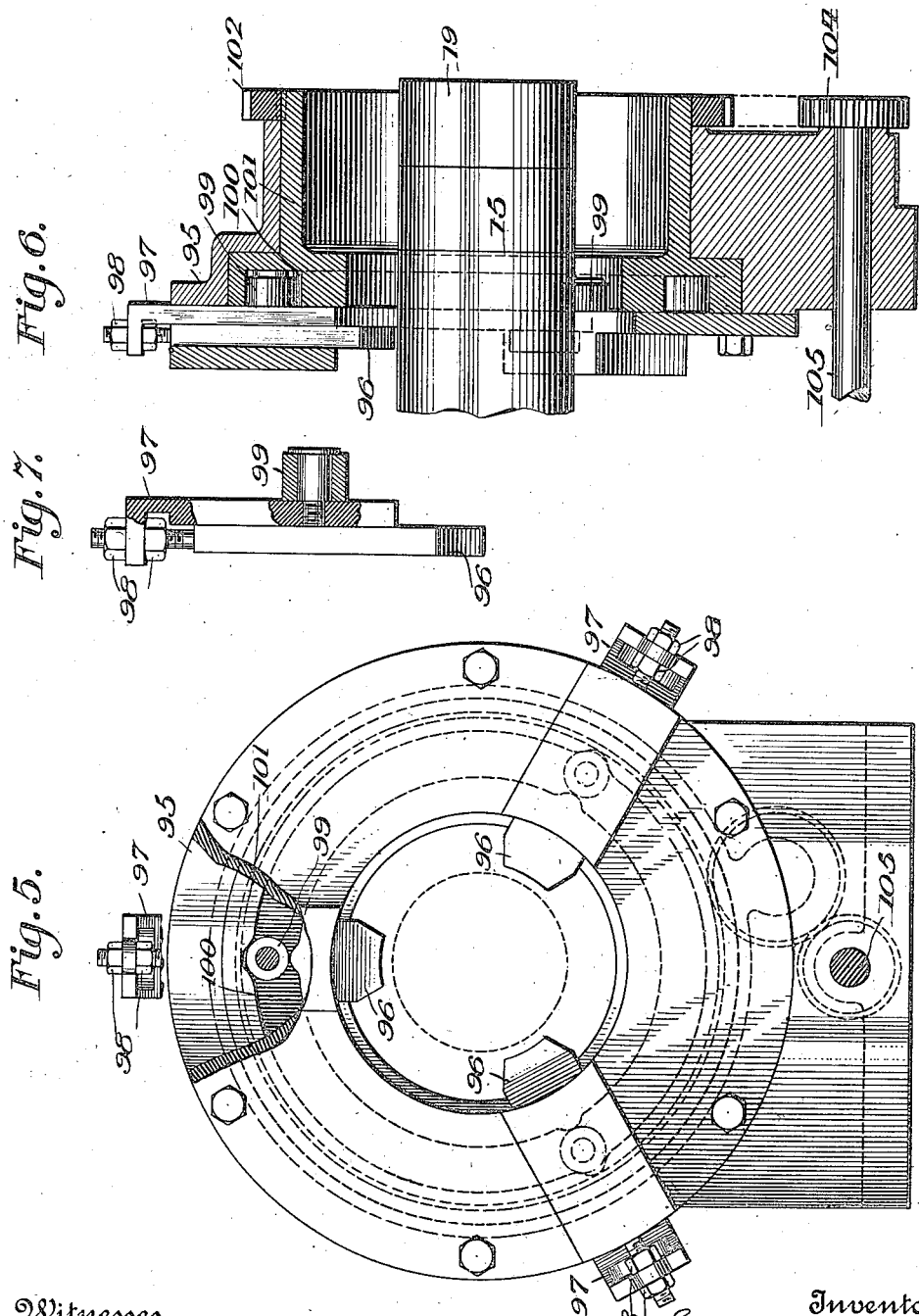

1,172,151. Patented Feb. 15, 1916.
5 SHEETS—SHEET 5.

Witnesses
Philip E. Barnes
Don N. Holmes.

Inventor
Lewis C. Maltby
By Vernon E. Hodge
his Attorney

_UNITED STATES PATENT OFFICE._

LEWIS C. MALTBY, OF WASHINGTON, DISTRICT OF COLUMBIA.

AUTOMATIC MACHINE FOR MAKING SPIRALLY-WOUND TUBES.

1,172,151.   Specification of Letters Patent.   Patented Feb. 15, 1916.

Application filed August 28, 1913.   Serial No. 787,127.

*To all whom it may concern:*

Be it known that I, LEWIS C. MALTBY, a citizen of the United States, residing at Washington, in the District of Columbia, have invented certain new and useful Improvements in Automatic Machines for Making Spirally-Wound Tubes, of which the following is a specification.

This invention relates to an improvement in automatic machines for making spirally-wound tubes.

This improvement comprises both winding and cutting mechanism, and means for automatically stopping the winding while the cutting into predetermined lengths is being done on the mandrel, the mandrel thus serving as a means of support for the tube in both forming and cutting operations.

Another feature of the invention is a means of support for the outer end of the mandrel during the cutting operation.

The invention consists in mechanism under the control of the operator, but automatic, for accomplishing these ends, the winding and forming of a tube of predetermined length first being completed, then automatically stopped, and the supporting means for the free end of the mandrel and the cutting of the tube into the predetermined commercial length acting coincidentally with the stoppage of the winding mechanism.

Figure 9:
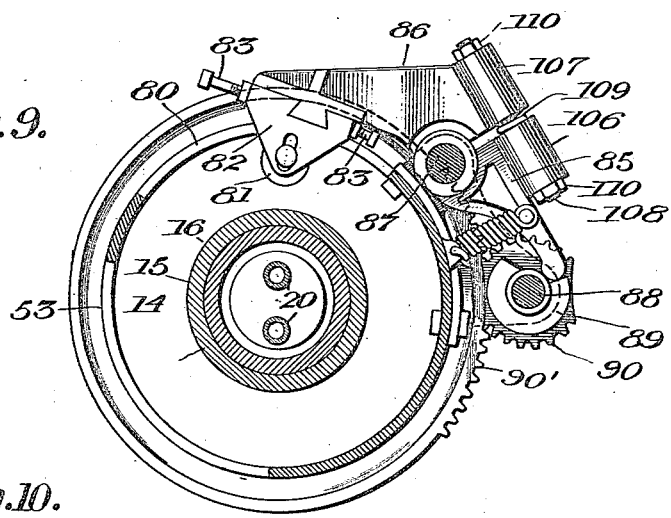
Figure 10:
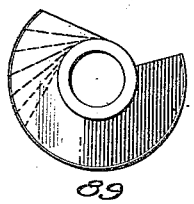
Figure 11:
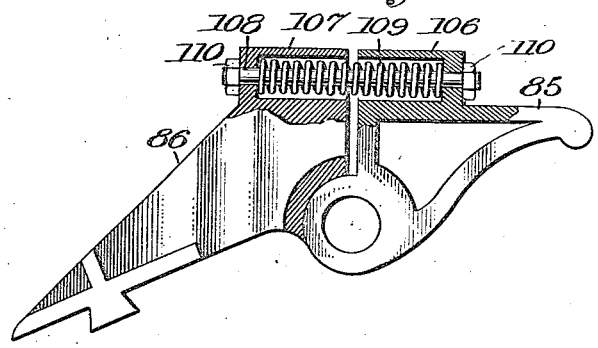
Figures 12, 13:
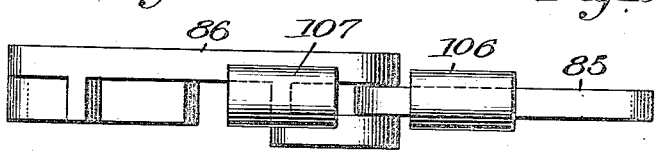

In the accompanying drawings:—Figure 1 is a view in perspective of the machine, Fig. 2 is a vertical longitudinal section, Fig. 3 is a view in side elevation of the mandrel, Fig. 4 is a sectional view of the same, Figs. 5, 6, and 7 are views of the steady-head for periodically supporting the outer end of the mandrel, Fig. 8 is a view in elevation of the mechanism for operating the belt pulleys, Fig. 8ª is a detail view of the mechanism for adjusting the cross-arms, Fig. 9 is a sectional view on the line 9—9 of Fig. 2, Fig. 10 is a view in elevation of one of the cams, and the dotted lines indicating the sizes of the other cams, Fig. 11 is a view in elevation of the cutter levers showing a portion thereof in section, and Figs. 12 and 13 show the two levers in top plan with the spring interposed therebetween omitted.

The bed 1 of the machine is supported at opposite ends on pedestals 2, 2, as shown in Fig. 1, the bed and pedestals being cast in hollow form for the purpose of lightness, and yet of sufficient thickness to afford the required strength. A mandrel 3 is disposed lengthwise of and parallel with the upper surface of the bed, it being held securely at one end by a support 5 bolted securely at one end of the bed. A portion of the mandrel is exposed, and across this exposed portion the tube is formed in any approved manner, as for instance by the usual crossed belts B, B but carried and driven by the winding-pulleys 6, 6, of which four only are shown, one journaled in each of the outer ends of the cross-arms 7, 7. These cross-arms 7, 7, are independently pivoted by means of pivot bolts 8, 8, to the bed 1. While these cross-arms are disposed diagonally and usually parallel with each other, as it is sometimes desirable to vary the pitch of the two spiral winds, a simple means of adjusting these cross-arms with respect to each other consists in a right and left screw 9, the threads of which turn in the nuts 10, 10, swiveled in the cross-arms. The position of the two cross-arms with respect to the bed is adjusted by the turn-bolt 11, swiveled to two lugs 12 and 13. The lug 12 is connected to the bed and the lug 13 is connected to one of the cross-arms. Obviously other means of adjustment might be provided and more than two cross-arms could be used according to the number of layers of material used in the formation of the tubes. Likewise any approved form of mandrel may be used, although in this invention a mandrel is contemplated such as illustrated in Figs. 3 and 4 in which it is composed of two tubes 14 and 15 telescopically secured together for a short distance and having mounted on the smaller tube a plurality of hard steel rings 16, 16, against which the cutters, hereinafter referred to, press in cutting the tube into predetermined lengths. Interposed between these hardened steel rings 16, 16, are space-blocks 17, 17, of softer steel, and these are all held in place by a threaded collar 19 screwed on the outer end of the smaller tube 15 of the mandrel.

The purpose of this preferred construction of mandrel is to afford easy adjustment with respect to the length of tube to be cut, also to insure the provision of the hard steel rings at the points where required to facilitate the cutting, and at the same time at the least expense of manufacture. A return-pipe 20 extends through the hollow mandrel to conduct steam therethrough in order to heat the mandrel to quickly dry the glue used in the formation of the tube.

Returning now to the winding mechanism and more particularly the means for automatically stopping and starting these pulleys:—A horizontally-disposed shaft 21 extends from end to end of each cross-arm 7, out through brackets 22 adjustably mounted on opposite ends of the cross-arms, in which the outer ends of this shaft 21 are journaled, and their protruding ends are provided with bevel-pinions 23 which engage a similar pinion 24 on the hub of the winding-pulleys for driving the latter. A bevel-pinion 25 is keyed at or near the center of shaft 21, and this is driven by a bevel-pinion 26 keyed on the upper end of a vertical shaft 27. Of course, there is a similar shaft 21 for each cross-arm, whether there be one, two, or more, there being two in the invention as illustrated. Each shaft 27 is provided at the lower end with a bevel-gear 29, which meshes with a bevel-gear 30 keyed on the clutch-section 31. The hub of this clutch-section 31 has a bearing in the hanger 32 depending from the bed. The inner face of this clutch-section 31 has clutch-teeth 33 of any approved form. Opposite the hanger 32 is another hanger 34 depending from the bed. In the lower ends of these hangers 32 and 34, the driving shaft 35 is journaled, and on this the usual loose and fixed pulleys 36 and 37 are mounted.

Keyed to the drive-shaft 35 is a spur-gear 38, the teeth of which mesh with the teeth of a large gear-wheel 39 keyed to the hollow shaft 40, which latter is supported at one end in the clutch section 31, and in the other end in the hanger 34. Loosely mounted on this hollow shaft 40 is a gear-wheel 41, the hub of which is in the form of a toothed-clutch section similar to clutch section 31, and the clutch-teeth 42, of which are similar to the clutch-teeth 33 of the clutch-section 31. Interposed between these two sets of clutch-teeth 33 and 42 are the loose clutch-sections 44 and 45, the teeth 46 and 47 of which are in position to engage the teeth 33 and 42 respectively.

A spiral spring 48 interposed between the clutch-sections 44 and 45 permits the latter to yield more or less, if occasion requires it, such as the tip ends of the teeth of the clutch-sections striking one another when the clutches are thrown in, after which the spring forces them yieldingly into position, as is well understood.

From the loose gear 41, motion is transmitted through intermediate gears 49 and 50, supported by brackets 51 and 52, respectively, on the bed of the machine to the tube-cutting mechanism carried by the slotted cylinder 53 revolubly supported in the bracket 52 at one end, and the bracket 54 at the other, erected on the bed 1; and the cylinder is provided with a toothed gear 55, which meshes with the gear 50, whereby motion is transmitted to the cutting-cylinder at predetermined intervals, as will be described more in detail.

To return now to the clutch mechanism for automatically and simultaneously throwing the winding mechanism into and the cutting mechanism out of action, and vice versa:—A rod 56 is fitted slidably in the bore of the hollow shaft 40. Keys 57, 57, are secured in slots in this rod 56, and their protruding ends pass through slots 58, 58, in the hollow shaft 40, and also into slots in the clutch sections 44 and 45, so that the rod 56 rotates with the hollow shaft 40 and is slidable therethrough to control the position of the clutch sections 44 and 45 to throw one in and the other out. This is done automatically by the following mechanism:—A counter-shaft 60 is journaled in the upper end of the bracket 34, and corresponding bracket 61 supported on the bed of the machine, and anti-friction thrust-bearings 62, 62, on either end of the bearing in the upper end of bracket 34 prevent endwise movement of the counter-shaft 60. Keyed more or less centrally on this counter-shaft 60 is a cam-wheel 63, the cam periphery 64 of which operates between anti-friction rollers 65, 65, carried on a sleeve 66, in which the rod 56 turns. Anti-friction thrust-bearings 67, 67, held between the sleeve 66 and the shoulder 68 on the one hand and a nut 69 on the other, insures the endwise movement of the rod 56, as the peripheral cam 64 of the cam-wheel 63 on the counter-shaft 60 bears endwise in either direction between the anti-friction rollers 65. When this rod is forced to the left, (see Fig. 2) it causes the clutch-section 31 to be engaged by the clutch-section 44, whereby to rotate section 31, and with it the gear 30, the vertical shaft 27 through the gear-wheel 29, and with it the shafts 21, of which only one is shown in detail (see Fig. 8), but both of which are operated through the clutch section 31.

The counter-shaft 60 is driven through a gear-wheel 70 keyed thereon, and clutch-gear 71 slidably mounted on the stub-shaft 72 (held at one end in the bracket 34). Clutch-gear 71 has clutch-teeth 73 in position to engage the clutch-teeth 74 on a pinion 75 loosely mounted on the stub-shaft, and which is constantly driven by pinion 76 keyed on one end of the hollow shaft 40. Shaft 60 and its cam-wheel 63 thus derive their motion from the drive-shaft 35 through the gears 38, 39, 76, 75, 71 and 70, and the cutting mechanism derives its motion through gears 41, 49, 50 and 55, when the gear 41 is clutched to the hollow shaft 40 by throwing the clutch-teeth 42 and 47 together.

In case of emergency, the entire apparatus may be stopped by the operator pulling the hand-lever 77 toward him, which, through rod 78 connected with clutch-gear 71, disengages the clutch-teeth 73, 74, against the action of the spring 79.

As previously mentioned, the formed tube is cut into predetermined lengths while still on the mandrel, and the winding stops when the cutting commences, and vice versa. As also previously explained, the cylinder 53 which carries the cutters is driven through the chain of gears 41, 49, 50 and 55, and these are so proportioned with respect to the cam 63 that the cylinder with the cutters makes two complete revolutions during the cessation of the winding mechanism.

The cylinder is provided with slots 80 through which the cutters 81 project, they being carried by the cutter-heads 82 mounted on the cylinder and adjustable through the set-screws 83, 83.

Two complete revolutions of the cylinder 53 are made to insure cutting the tubes perfectly, and the cutters toward the outer end of the mandrel are set and travel in advance, one after another, so that the outer tube is always completely severed before the next tube is cut from the stock, and so on successively until all are completely cut from the main tube at the conclusion of the second complete revolution.

The cutter-levers which carry the cutter-heads are preferably made in two parts 85 and 86 mounted on a shaft 87, and a shaft 88 parallel therewith carries cams 89 which engage the free end of lever-section 85 to hold the cutter to its work. Shaft 88 is periodically operated by a mutilated-gear 90 meshing with a mutilated-gear 90' on the bracket 54.

The cutter-levers 85 and 86 are each provided with a housing 106 and 107, respectively. These housings are connected together by means of a bolt 108 which is provided with nuts 110, 110 at each end thereof, for regulating the distance between the levers.

Surrounding the bolt and located within the housings is a spiral spring 109. The object of this spring is to overcome any obstructions which may enter the path of the cutter-heads. For instance, if by any chance, a nail or other obstruction should be taken up by the glued strips and wound into the tube, and during the cutting operation the knives should come in contact with the nail, they would act against the tension of the spring 109, instead of being forced against the nail and endangering the cutting blade. The tension of the spring 109 is sufficient to cause the cutter 81, under normal working conditions, to perform the cutting operation, but when any obstruction is placed in the path of the cutters, they will act against the tension of the spring and ride over the obstruction.

To absolutely insure against the cylinder turning too far at the conclusion of the second complete revolution, a projection 91 is located on the cylinder in the path of the stop 92, which latter is slidably mounted in the box 93 on the bed, and is forced into the path of the projection 91 by the periphery of the cam-wheel 63.

Means is provided for supporting the outer and otherwise free end of the mandrel during its cutting operation. To this end, a steady-head 95 is mounted at the outer end of the bed. This is provided with three radially-disposed slidable jaws 96 slidable in boxes radially-disposed in the head 95. These jaws 96 are each adjustably connected with a plate 97 by means of locknuts 98, 98, and the plate 97 has an antifriction roller 99 thereon, which traverses a cam-groove 100 in the cam ring 101. This cam-ring is intermittently turned through gears 102, 103, and 104, the latter keyed to the outer end of the shaft 105 on which the gear-wheel 50 is mounted. This steady-head is so timed that it makes a third of a revolution to each two revolutions of the cutter-cylinder 53, and while it is making the third of a revolution it is holding the jaw 96.

To briefly recapitulate, the entire operation is automatic. The winding continues until a predetermined length of tube is completed, whereupon the winding automatically stops and the cutting and holding by the steady-head commences. This continues until the two complete revolutions of the cutter-cylinder have been completed, whereupon the winding automatically starts again. This alternate operation continues indefinitely until the machine is stopped.

Having fully described my invention, what I claim as new and desire to secure by Letters Patent, is:—

1. An automatic machine for making spirally-wound tubes comprising a mandrel, means for forming the tube on said mandrel, cutting-means traveling around the mandrel, and means for causing alternate intermittent action of the winding and cutting mechanisms.

2. An automatic machine for making spirally-wound tubes comprising a stationary mandrel, means for forming the tube on said mandrel, cutting means adapted to travel around the mandrel for cutting the tube while still on the mandrel, and means for automatically and alternately driving the winding and cutting mechanism.

3. An automatic machine for making spirally-wound tubes comprising a stationary mandrel, means for forming the tube on said mandrel, cutting means adapted to travel around the mandrel for cutting the tube while still on the mandrel, means for automatically and alternately driving the winding and cutting mechanism, and a steady-head for automatically gripping and holding one end of the mandrel during the cutting operation.

4. An automatic machine for spirally-wound tubes, comprising a mandrel upon which the tube is formed, means for winding the tube on the mandrel, cutting-means which travels periodically around the mandrel, and mechanism for automatically stopping and starting the winding and cutting means alternately and causing the latter to make two complete revolutions around the mandrel.

5. In an automatic machine for making spirally-wound tubes, a mandrel composed of a hollow tube with means for heating the latter, and removable alternately-arranged hard and soft steel rings or spacers located on the mandrel, and cutters which rotate around the mandrel and are located opposite the hard rings whereby to cut the tube in predetermined lengths.

6. In an automatic machine for making spirally-wound tubes, a mandrel composed of a hollow tube with means for heating the latter, removable alternately-arranged hard and soft steel rings or spacers located on the mandrel, and cutters which rotate around the mandrel and are located opposite the hard rings whereby to cut the tube in predetermined lengths, said cutters arranged one slightly in advance of another, whereby the outermost cuts are completed in advance of the others.

7. An automatic machine for making spirally-wound tubes comprising a mandrel, winding mechanism for forming a spiral tube on the mandrel, cutting mechanism for cutting the tube while on the mandrel, and means for automatically stopping and starting said mechanisms alternately.

8. An automatic machine for making spirally-wound tubes, comprising a mandrel, cutting mechanism rotatable around one end of the mandrel, operating to cut the tube while on the mandrel, winding mechanism for forming a spiral tube on the mandrel, clutches, and means for automatically shifting the clutches, whereby to alternately and automatically drive the winding and cutting mechanisms.

9. An automatic machine for making spirally-wound tubes comprising a mandrel, cutting mechanism rotatable around one end of the mandrel, operating to cut the tube while on the mandrel, winding mechanism for forming a spiral tube on the mandrel, a steady-head having movable jaws, clutches, means for automatically shifting the clutches whereby to alternately and automatically drive the winding and cutting mechanisms, and actuate the jaws of the steady-head to engage the mandrel as the cutting mechanism is rotated around the latter.

10. An automatic machine for making spirally-wound tubes comprising a mandrel, means for forming the tube on the mandrel, cutting means for cutting the tube while still on said mandrel, and tension means for normally holding the cutters in a position to perform the cutting operation, and the cutting means acting against the tension means when obstructions are placed in the path of the cutting means, and means for intermittently actuating the winding and cutting means alternately.

11. An automatic machine for making spirally-wound tubes, comprising a mandrel, winding-mechanism for forming a spirally-wound tube on the mandrel, cutting-mechanism for cutting the tube while on the mandrel, means for causing the winding and cutting-mechanisms to operate alternately, the winding-mechanism holding the tube while the cutting-mechanism cuts it into lengths.

12. An automatic machine for making spirally-wound tubes comprising a mandrel, winding-mechanism for forming a spirally-wound tube on the mandrel, cutting-mechanism for cutting the tube while on the mandrel, means for causing the winding and cutting-mechanisms to operate alternately, the winding-mechanism holding the tube while the cutting-mechanism cuts it into lengths, said cutting-mechanism comprising a plurality of cutters, one cutting in advance of another.

13. An automatic machine for making spirally-wound tubes comprising a mandrel, winding-mechanism and cutting-mechanism for forming and cutting the tube on the mandrel respectively, said cutting-mechanism comprising a plurality of cutters arranged lengthwise of the mandrel, whereby to cut the tube simultaneously into a plurality of lengths, one cutter in advance of another, whereby the severing of the tubes is successively and progressively completed from the outer toward the inner end of the tube.

14. An automatic machine for making spirally-wound tubes comprising a stationary mandrel, winding-mechanism for forming a spiral tube on the mandrel, a cylinder through which the mandrel extends, and which revolves around the latter, a plurality of cutters carried by the cylinder for cutting the tube while on the mandrel, and means for adjusting said cutters independently.

15. An automatic machine for making spirally-wound tubes comprising a mandrel, winding-mechanism for forming a spiral tube on the mandrel, a cylinder through which the mandrel extends, and which revolves around the latter, a plurality of cutters carried by the cylinder and extending throughout a portion of the length of the mandrel, whereby to cut the tube simultaneously into lengths, while on the mandrel, and means for adjusting said cutters independently, said cutters arranged one in advance of the next one successively throughout the several cutters.

16. In an automatic machine for making spirally-wound tubes, a stationary mandrel, winding-mechanism for forming a spiral tube on the mandrel, a cylinder through which the mandrel extends, and which periodically revolves around the mandrel, cutter-levers which carry cutter-heads, made in two parts and having a spring interposed therebetween for cutting the tube while on the mandrel, and a shaft parallel to the cylinder upon which said lever parts are mounted.

17. In an automatic machine for making spirally-wound tubes, a stationary mandrel, winding-mechanism for forming a spiral tube on the mandrel, a cylinder through which the mandrel extends, and which periodically revolves around the mandrel, cutter-levers which carry cutter-heads, made in two parts and having a spring interposed therebetween for cutting the tube while on the mandrel, a shaft upon which said lever parts are mounted, and a cam-shaft carried by the cylinder parallel with said last-named shaft, the cams upon which engage the free end of one of said parts of the cutter-levers whereby to hold the cutter to its work, and means for rotating said cam-shaft periodically.

18. An automatic machine for making spirally-wound tubes, comprising a stationary mandrel, mechanism for winding the tubes spirally on the mandrel, cutting mechanism for cutting the tubes into lengths while on the mandrel, a steady-head, jaws slidably connected with the latter, and means for communicating motion from the cutting mechanism to the jaws in the steady-head whereby the latter are automatically operated simultaneously with the movement of the cutters.

19. An automatic machine for making spirally-wound tubes, comprising a stationary mandrel, mechanism for winding the tubes spirally on the mandrel, cutting mechanism for cutting the tubes into lengths while on the mandrel, a steady-head radially-disposed jaws slidably connected with said head, anti-friction rollers connected with said jaws, and a cam-ring having a cam-groove which engages said rollers whereby to actuate the jaws, a gear-wheel on said ring, a gear meshed with the gear-wheel, a shaft, a gear carried on the shaft and meshing with a gear carried by the cutting mechanism, whereby the jaws are simultaneously thrown into contact with the outer end of the mandrel when the cutters are actuated.

20. An automatic machine for making spirally-wound tubes comprising a mandrel, means for spirally-winding tubes thereon, cutting-mechanism, and means for automatically stopping the winding-mechanism and starting the cutting-mechanism whereby the tube is held by the winding mechanism against turning upon the mandrel while the cutting mechanism is set in motion and caused to cut the tube into lengths while still on the mandrel.

In testimony whereof I affix my signature, in the presence of two witnesses.

LEWIS C. MALTBY.

Witnesses:
EMILY F. CAMP,
WATTS F. ESTABROOK.